(12) United States Patent
Sovio et al.

(10) Patent No.: US 11,126,706 B2
(45) Date of Patent: Sep. 21, 2021

(54) HYPERVISOR MEASUREMENT AGENT

(71) Applicant: HUAWEI TECHNOLOGIES CO., LTD., Shenzhen (CN)

(72) Inventors: Sampo Sovio, Helsinki (FI); Martti Takala, Kista (SE); Valentin Manea, Kista (SE); Parvez Shaik, Kista (SE); Liming Wu, Bonn (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 174 days.

(21) Appl. No.: 16/491,319

(22) PCT Filed: Mar. 7, 2017

(86) PCT No.: PCT/EP2017/055321
§ 371 (c)(1),
(2) Date: Sep. 5, 2019

(87) PCT Pub. No.: WO2018/162040
PCT Pub. Date: Sep. 13, 2018

(65) Prior Publication Data
US 2020/0019695 A1 Jan. 16, 2020

(51) Int. Cl.
*H04L 29/06* (2006.01)
*G06F 21/44* (2013.01)
*G06F 21/12* (2013.01)
*G06F 21/57* (2013.01)
*G06F 21/60* (2013.01)
*G06F 21/74* (2013.01)

(52) U.S. Cl.
CPC ............ *G06F 21/44* (2013.01); *G06F 21/126* (2013.01); *G06F 21/57* (2013.01); *G06F 21/602* (2013.01); *G06F 21/74* (2013.01)

(58) Field of Classification Search
CPC .. G06F 9/45558; G06F 9/45533; G06F 21/53; G06F 21/44; H04L 63/10
See application file for complete search history.

(56) References Cited

U.S. PATENT DOCUMENTS

2010/0115625 A1* 5/2010 Proudler ............... H04L 9/0836
726/27
2013/0061056 A1* 3/2013 Proudler ................. G06F 21/57
713/176
(Continued)

FOREIGN PATENT DOCUMENTS

CN 101783801 A 7/2010
CN 103843303 A 6/2014
(Continued)

OTHER PUBLICATIONS

Arvind Seshadri et al., "SecVisor: A Tiny Hypervisor to Provide Lifetime Kernel Code Integrity for Commodity OSes", SOSP '07, Oct. 14-17, 2007, total 17 pages.
(Continued)

*Primary Examiner* — Jason K Gee
(74) *Attorney, Agent, or Firm* — Maier & Maier, PLLC (57) ABSTRACT

An apparatus including a processor and a memory configured to provide an SEE and an REE. The processor is configured to provide a client application configured to execute at a user privilege level and a hypervisor configured to execute at a hypervisor privilege level. The user privilege level is more restrictive than the hypervisor privilege level. The processor is further configured to provide a trusted application configured to execute within the SEE. The trusted application provides secure services to the client application. The processor is configured to send a request for secure services from the client application to the trusted application, send a measurement request to the hypervisor, generate within the hypervisor a measured value based on the client application, return the measured value to the trusted application, and determine whether the client application is authorized to access the secure services. The authorization determination is based on the measured value.

20 Claims, 3 Drawing Sheets

(56) References Cited

U.S. PATENT DOCUMENTS

| | | | |
|---|---|---|---|
| 2014/0208123 A1 | 7/2014 | Roth et al. | |
| 2015/0074419 A1 | 3/2015 | Durham et al. | |
| 2015/0220745 A1 | 8/2015 | Nellitheertha et al. | |
| 2016/0299778 A1 | 10/2016 | Barak et al. | |
| 2018/0189092 A1* | 7/2018 | Sanchez Leighton | ........................ G06F 9/45558 |

FOREIGN PATENT DOCUMENTS

| | | |
|---|---|---|
| CN | 104751050 A | 7/2015 |
| CN | 105446713 A | 3/2016 |
| CN | 105468980 A | 4/2016 |
| CN | 105574414 A | 5/2016 |
| CN | 105786588 A | 7/2016 |
| CN | 103620613 B | 6/2018 |

OTHER PUBLICATIONS

Arm Developer, "Technologies", Retrieved from internet:https://developer.arm.com/technologies, Dec. 14, 2019, total 3 pages.

Dmitry Kasatkin et al., "Integrity Measurement Architecture (IMA)", Retrieved from internet:https://sourceforge.net/p/linux-ima/wiki/Home/ , Dec. 14, 2019, total 17 pages.

Wang Dongbo, "Attestation for Trusted Virtual Computing Environment in Grid System", Microcomputer Information, 2008, vol. 24, Issue 1-3, 3 pages. English Abstract provided.

* cited by examiner

HYPERVISOR MEASUREMENT AGENT

This application is a National Stage of International Patent Application No. PCT/EP2017/055321, filed on Mar. 7, 2017, which is hereby incorporated by reference in its entirety.

FIELD

The aspects of the present disclosure relate generally to software security and more particularly to authorization and authentication for access to secure services.

BACKGROUND

Modern computing apparatuses, such as computing apparatuses used in mobile communication devices, are seeing an increased reliance on digital security to protect sensitive and valuable digital information. Ideally security critical software programs should be executed in a secure execution environment such as a hardware based trusted execution environment. A secure execution environment is preferably an isolated computing space where it is safe to use cryptographically secure resources such as cryptographic keys, sensitive data, and proprietary cryptographic algorithms. Isolation ensures that only authorized entities, processes, objects, etc. are able to access the protected secure services and secure resources.

To enhance security it is desirable to limit the secure execution environment to a small set of security critical applications, known as trusted applications. Because of this need to limit the size and scope of the trusted applications, this small set of trusted applications does not provide sufficient functionality to support a rich computing experience expected by today's end users. Providing this enjoyable computing experience is typically delegated to rich operating system, such as the Android Framework, Linux, Windows Phone OS, iOS, as well as other rich operating systems. However, the size of a rich operating system and the need to release numerous patches and updates leaves them vulnerable to attack. In 2010 Linux grew to 15 million lines of code and 37,000 files.

Conventional security solutions are designed to run normal world applications within a rich execution environment and delegate secure services to trusted applications running in a secure execution environment, and use well defined secure communication channels to transfer messages between these environments. For example a media player may send a digital rights management (DRM) license containing encrypted content to a trusted application executing within a secure environment to have the license content decrypted. After decryption, the trusted application can return the decrypted content to the media player application.

A security problem arises in the above use case where a malicious application may pretend to be a media player. The DRM trusted application has no means to detect the security attack and may provide the requested secure service to the malicious application. In general the trusted application cannot authenticate the client application and may therefore provide sensitive information to an unauthorized client application.

It is common for authorized client applications to change, such as when a software update is released or when a user downloads a different type of client application from a known source or author that needs to have access to secure services provided by the trusted applications running in the secure execution environment.

Thus there is a need for improved methods and apparatuses for determining when a client application is authorized to access secure services provided by trusted applications that are executing in a secure execution environment where the secure execution environment includes confidential key material. Accordingly it would be desirable to provide methods and apparatus that addresses at least some of the problems identified above.

SUMMARY

It is an object of the disclosed embodiments to provide improved apparatuses and methods for protecting secure services in computing apparatus and mobile communication devices. Reliably authenticating computer applications attempting to access secure service poses a security risk. This security risk is solved by the aspects of the disclosed embodiments.

According to a first aspect of the above, further objects and advantages are obtained by an apparatus including a processor and a memory, where the processor and the memory are configured to provide a secure execution environment and a rich execution environment. The processor is configured to provide a client application configured to execute within the rich execution environment at a user privilege level and a hypervisor configured to execute within the rich execution environment at a hypervisor privilege level. The user privilege level is more restrictive than the hypervisor privilege level. The processor is further configured to provide a trusted application configured to execute within the secure execution environment (SEE). The trusted application provides secure services to the client application. The processor is configured to send a request for secure services from the client application to the trusted application; send a measurement request from the trusted application to the hypervisor; generate within the hypervisor a measured value based on the client application; return the measured value from the hypervisor to the trusted application; and determine within the trusted application whether the client application is authorized to access the requested secure services. The authorization determination is based on the measured value. This allows the computing apparatus to securely and reliably identify the client application before authorizing access to secure services. Generating the measured value within the hypervisor reduces risk as compared to generating the measured value in the Linux kernel.

In a first possible implementation form of the apparatus according to the first aspect the processor is further configured to provide an authorization service configured to execute within the secure execution environment. The processor is configured to send an authorization request from the trusted application to the authorization service, where the authorization request includes information corresponding to the client application and the request for secure services. The processor sends the measurement request from the authorization service to the hypervisor. The use of an authorization service in the SEE provides the advantage that several trusted applications can all access the same authorization service to authorize a client application without replicating the authorization code in each trusted application.

In a second possible implementation form of the apparatus according to the first aspect as such or according to the first possible implementation form of the first aspect the authorization service includes an access control list, and the processor is configured to determine whether the client application is authorized to access the requested secure services based on the measured value and the access control list. Including an access control list in the authorization service eliminates the need to access an external service for every authorization determination.

In a third possible implementation form of the apparatus according to the first aspect as such or according to the second possible implementation form of the first aspect where, if the measured value is not found in the access control list, the processor is configured to send a request for authorization from the authorization service to a network based authorization server, where the request for authorization includes the measured value. The processor receives an authorization result from the network based authorization server and determines whether the client application is authorized to access the requested secure services based on the authorization result. Accessing an external authorization service allows the apparatus to adapt its authorization determination as new client applications are installed or as client applications are updated.

In a fourth possible implementation form of the apparatus according to the first aspect as such or according to the third possible implementation form of the first aspect the processor is configured to update the access control list based on the received authorization result. Updating the local access control list based on results received form the network based service reduces the number of times the authorization service needs to contact the external network based service.

In a fifth possible implementation form of the apparatus according to the first aspect as such or according to any one of the preceding possible implementation forms the processor is configured to establish a secure communication channel between the secure execution environment and the hypervisor, and send the measurement request from the secure execution environment to the measurement agent via the secure communication channel. Using a secure communication channel prevents a malicious application from intercepting the measurement request or response to obtain access to secure services to which it is not authorized.

In a sixth possible implementation form of the apparatus according to the first aspect as such or according to the fifth possible implementation form of the first aspect the memory includes a physical random access memory and the secure communication channel includes a secure portion of the physical random access memory. The secure portion of the physical random access memory is accessible only to the secure execution environment and the hypervisor. Use of secure shared memory provides an efficient and secure means for protecting communications between the authorization service and the measurement agent.

In a seventh possible implementation form of the apparatus according to the first aspect as such or to any one of the preceding possible implementations forms the memory includes a non-volatile memory and the measured value includes a hash value. The processor is configured to load the client application from the non-volatile memory into a predetermined portion of the physical random access memory and generate the hash value based on the predetermined portion of the physical random access memory. Loading the client application into a predetermined portion of the physical random access memory allows the measurement agent to locate the client application without relying on the kernel to obtain the location of the client application.

In an eighth possible implementation form of the apparatus according to the first aspect as such or according to the seventh possible implementation form of the first aspect the processor is configured to generate the hash value by calculating a hash over the data stored in the predetermined portion of the physical random access memory. Calculating the hash over the predetermined portion of the physical random access memory allows the measurement agent to generate the measurement without coordinating with other lower priority and less secure computer applications.

In a ninth implementation form of the apparatus according to the first aspect as such or to the seventh or eighth possible implementation forms of the first aspect the processor is configured to provide an operating system kernel configured to execute within the rich execution environment at a kernel privilege level, where the kernel privilege level is more restrictive than the hypervisor privilege level and the kernel privilege level is less restrictive than the user privilege level. The processor loads the client application while operating at one of the kernel privilege level and the hypervisor privilege level. Most operating system kernels include code to load client applications. Using the kernel to load the client application reduces the amount of code development and keeps the hypervisor small.

In a tenth possible implementation form of the apparatus according to the first aspect as such or to any of the seventh through ninth possible implementation forms of the first aspect the processor is configured to generate a digital signature of the predetermined portion of the physical random access memory after the client application has been loaded, and the measured value includes the digital signature. Use of a digital signature adds a level of cryptographic security to the measurement.

In an eleventh possible implementation form of the apparatus according to the first aspect as such or to any one of the preceding possible implementation forms of the first aspect the measured value comprises meta data about the client application, and the processor is configured to generate the measured value based on at least one of the hash value, the digital signature, a digital certificate corresponding to the author of the client application, and a digital certificate corresponding to the client application. This provides a reliable measurement value that uniquely identifies the client application.

According to a second aspect of the above, further objects and advantages are obtained by a mobile communication device incorporating the apparatus according to the first aspect as such or to any one of the preceding possible implementation forms of the first aspect. Modern mobile communication equipment is well adapted to take advantage of the benefits provided by the first aspect or any of the implementation forms of the first aspect.

According to a third aspect of the above, further objects and advantages are obtained by a method that includes sending a request for secure services from a client application to a trusted application, where the client application is executing at a user privilege level within a rich execution environment and the trusted application is executing within a secure execution environment. The method sends a measurement request from the secure execution environment to a hypervisor, where the hypervisor is executing at a hypervisor privilege level within the rich execution environment, and generates a measured value within the hypervisor, where the measured value comprises meta-data corresponding to the client application. The method returns the measured value from the hypervisor to the trusted application, determines within the secure execution environment an authorization result where the authorization result is based on the measured value and the authorization result comprises an indication whether the client application is authorized to access the requested secure services. The method provides the determined authorization result to the trusted application. This method provides a secure means of identifying a client application before authorizing access to secure services.

According to a fourth aspect of the above, further objects and advantages are obtained by a computer program product including non-transitory computer program instructions that when executed by a processor are configured to cause the processor to perform the method according to the third aspect.

According to a fifth aspect of the above, further objects and advantages are obtained by a radio receiver including the apparatus according to first aspect as such or to any one of the preceding possible implementation forms of the first aspect.

BRIEF DESCRIPTION OF THE DRAWINGS

In the following detailed portion of the present disclosure, the invention will be explained in more detail with reference to the example embodiments shown in the drawings, in which.

DETAILED DESCRIPTION OF THE DISCLOSED EMBODIMENTS

Figure 1:
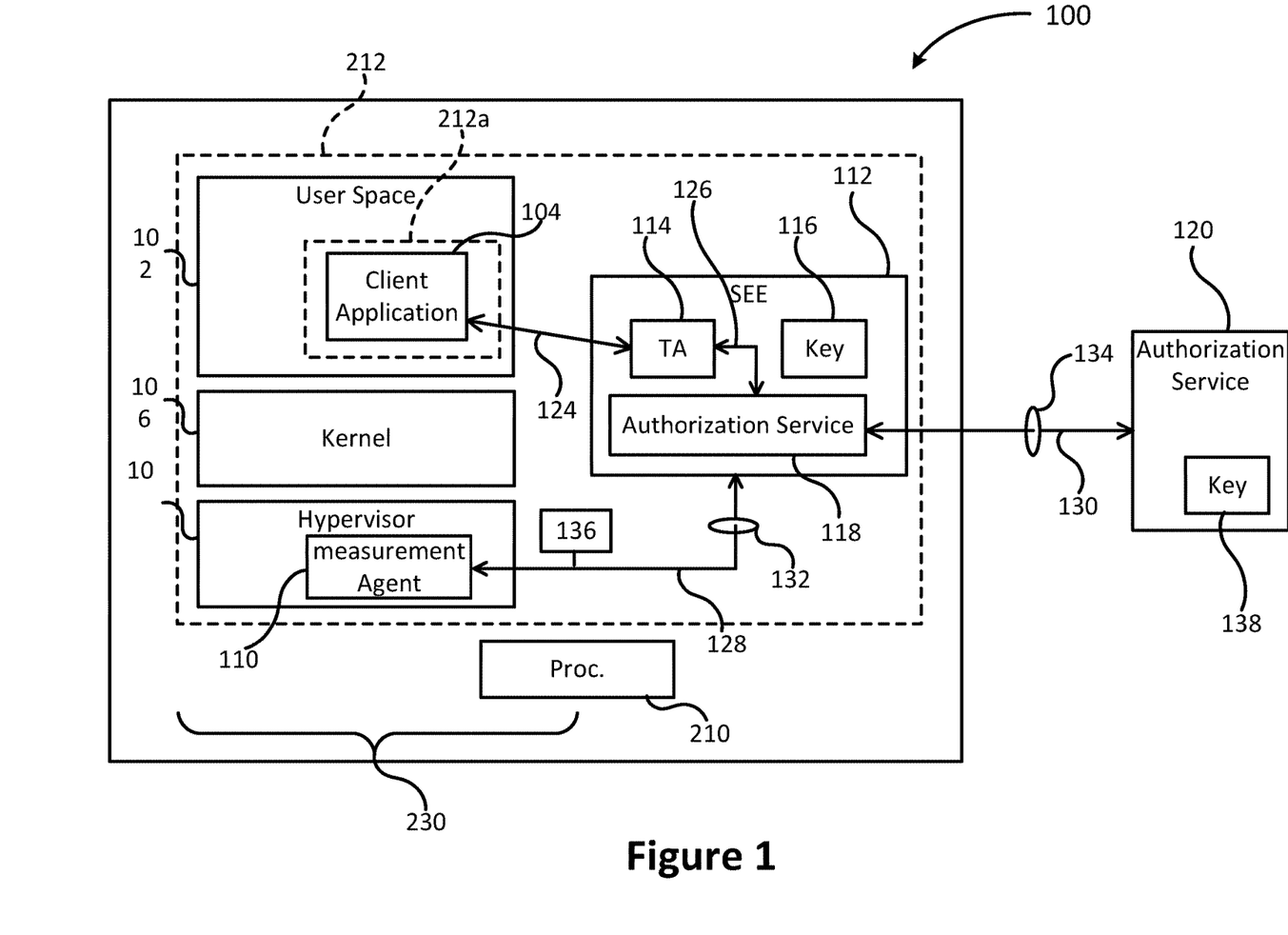
FIG. 1 illustrates a block diagram of an exemplary computing apparatus incorporating aspects of the disclosed embodiments.

FIG. 1 illustrates a block diagram of an exemplary computing apparatus 100 incorporating aspects of the disclosed embodiments. The exemplary computing apparatus 100 includes a processor 210 and a memory 212 where, as will be described further below, the processor 210 and memory 212 are configured to provide a secure execution environment (SEE) 112 and a rich execution environment (REE) 230. As used herein the term secure execution environment (SEE) 112 generally refers to a computing environment configured to ensure the confidentiality and integrity of computer program code and data that are executing or stored within the SEE 112.

Integrity and security of the SEE 112 may be improved by reducing the amount of program code and functionality provided by the SEE 112. An appropriately safe SEE 112 is therefore unable to provide the rich computing experience users of computing apparatus have come to expect. To support such a desirably rich computing experience, the computing apparatus 100 is configured to provide a rich execution environment 230 that can operate alongside but separate from the SEE 112.

As used herein the term REE 230, also sometimes referred to as the "normal world", or "normal world computing environment", and generally encompasses all hardware and software of the computing apparatus 100 with the exception of the hardware, firmware, and/or software that is incorporated within and protected by the SEE 112. The REE 230 is configured to provide hardware and software capable of supporting a rich computing experience to satisfy the expectations of modern users.

The SEE 112 includes both physical and software security to protect its contents from attacks originating within malicious computer applications and/or from physical tampering with the computing apparatus 100. In contrast a REE 230 does not provide the same high degree of security as is provided by a SEE 112. However, the REE 230 does include a diverse set of software and hardware based protections to allow multiple computer applications to safely execute side by side while being protected from unwanted access or attack by other concurrently executing computer applications.

Protections in the SEE 112 are provided by privilege levels, also referred to herein as execution modes. These privilege levels or execution modes may be provided by CPU-based protections and/or may be supported by other specialized hardware protections as desired. CPU-based protections are based on the concept of privilege whereby a more privileged computer applications can modify both its own resources as well as the resources of less privileged computer applications. In this way a more privileged computer application may restrict or prevent a less privileged computer application from accessing certain resources. As used herein a more privileged application is said to have a higher privilege level and is less restricted as to the computing resources it can access than a computer application that has less privilege or is executing at a lower privilege level. A computer application executing at a lower privilege level is said to be more restricted than a computer application executing at a higher privilege level.

In one embodiment, a client application 104 is configured to execute within the rich execution environment 230 at a user privilege level. A hypervisor 108 is configured to execute within the rich execution environment 230 at a hypervisor privilege level. The user privilege level is more restrictive than the hypervisor privilege level. A trusted application 114 is configured to execute within the secure execution environment 112 and to provide secure services to the client application.

In one embodiment, the processor 210 is configured to send a request for secure services 124 from the client application 104 to the trusted application 114. The processor 210 is also configured to send a measurement request 128 from the trusted application 114 to the hypervisor 108 and generate within the hypervisor 108 a measured value based on the client application 104.

Figure 2:
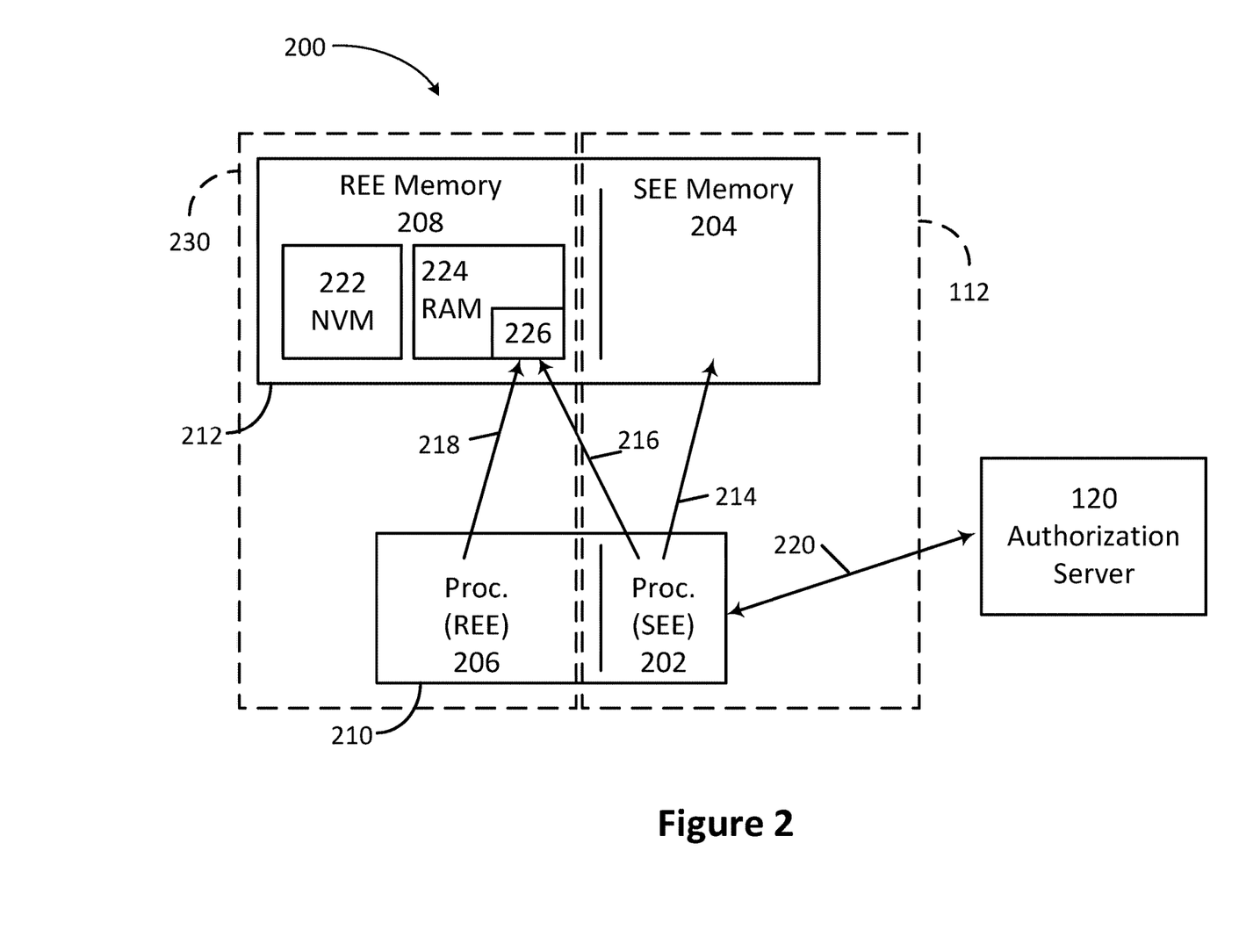
FIG. 2 illustrates a block diagram of an exemplary computing platform incorporating aspects of the disclosed embodiments.

As illustrated in FIGS. 1 and 2, the processor 210 is configured to return the measured value from the hypervisor 108 to the trusted application 114 and determine within the trusted application 114 whether the client application 104 is authorized to access the requested secure services. The determination in this example is based on the measured value. In certain embodiments the determination may be based on an access control list. When desired the measured value may include information about an author or source of the client application 104 and the determination may be based on a same source or same author policy where client applications created by a trusted source or author are authorized to access the requested secure services.

The hypervisor 108 is included in the REE 230 to provide basic software services and to manage the computer hardware and other computing resources. A hypervisor 108, also referred to as a virtual machine manager or virtual machine monitor, is a relatively small computer application configured to create and run virtual machines. Throughout this specification certain computer applications will be described as performing operations, providing functionality, undertaking actions, etc., however it should be understood that the processor 210 is actually performing the operations, functionality, actions etc., while executing computer program instructions associated with the described computer application. A virtual machine is a virtual operating platform configured by the hypervisor 108 to appear to guest applications hosted, or executing, within the virtual machine as if the guest application were executing directly on a hardware platform. An application that executes inside a virtual machine or virtual operating platform is referred to as a guest application.

The hypervisor 108 creates an abstraction of the actual computer hardware and exposes only the hardware abstraction to guest applications. The hypervisor 108 executes at a hypervisor privilege level also referred to herein as hypervisor mode, which is the highest privilege level provided by the processor 210. This hypervisor privilege level allows the hypervisor 108 to hide portions of the computer hardware, such as portions of memory 212 or other hardware devices (not shown), from guest computer applications.

Guest applications executing within a virtual machine execute at a lower privilege level than the hypervisor 108, thus the hypervisor 108 can restrict, or prevent, the guest applications from accessing or even discovering computer resources that are not included in the hardware abstraction presented to their virtual machine. For example, the computing apparatus 100 may include a memory management unit or other memory management means such as page tables to manage portions of the memory 212. By omitting the memory management unit, page tables, or other memory management means from the hardware abstractions presented to a virtual machine, a guest application, such as the kernel 106, executing within the virtual machine at a lower privilege level, will be unable to access or discover these protected portions of the memory 212. In this fashion the hypervisor can reserve certain protected portions of physical memory 136 for its own use. Because the hypervisor 108 is executing at the hypervisor privilege level, which is the highest and least restrictive privilege level, and guest applications are executed at a kernel privilege level, where the kernel privilege level is lower and more restrictive than the hypervisor privilege level, the guest application is not able to access the hardware directly but allowed to access only the hardware abstraction provided to the virtual machine by the hypervisor 108.

The kernel 106 is a guest application executing within a virtual machine configured by the hypervisor 108. The kernel 106 is an operating system (OS) kernel such as any of the various flavors of the widely distributed Linux OS, the Android framework or Android OS maintained by GOOGLE™ Inc., iOS maintained by APPLE™ Inc., the Windows OS maintained by MICROSOFT™ Corp., or other appropriate proprietary or publicly available operating systems as desired. An operating system is a type of computer application configured to provide common services for other computer applications and to manage hardware and software resources of a computing apparatus. The core of an operating system is known as the kernel 106 and may also be referred to as an operating system kernel 106. The kernel 106 manages the user space 102 and connects client applications 104 executing in user space 102 to available hardware and software resources of the computer. However, in the computing apparatus 100 the kernel 106 is executing within a virtual machine or virtual operating platform at a kernel privilege level, which is lower than the hypervisor privilege level, and therefore has access to and can manage only the hardware and other computing resources included in the hardware abstraction exposed to the kernel 106 by the hypervisor 108.

In conventional solutions integrity of the kernel 106 and SEE 112 are guaranteed through a secure boot process. The images containing the kernel 106 and SEE 112 may include a digital signature such that only authorized entities are capable of generating the digital signatures. This guarantees that attackers are not capable of replacing the kernel 106 or SEE 112 with malicious versions. Because the kernel 106 is directly interacting with the client application 104 executing in user space 102, there is risk that a malicious client application 104 can corrupt tine kernel 106 in a way that allows unauthorized access to secure services. It is much more difficult for a client application 104 executing in user space 102 to corrupt the hypervisor 108 because the hypervisor 108 has a much smaller code base and does not directly interact with the client application 104.

The kernel 106 is adapted to configure and manage a user space 102, or more particularly to load, execute, and manage client applications 104 within the user space 102. The kernel 106 may, when desired, load and execute a number of client applications 104 and manage the computing resources used by each client application 104. Client applications are executed at a lower privilege level, referred to herein as a user privilege level. The user privilege level is lower than the kernel privilege level. By executing client applications at a user privilege level the kernel 106 is able to control the computing resources used by each client application 104 and restrict one client application 104 from accessing or corrupting the kernel 106 or any other portion of user space 102.

The hypervisor 108 includes a measurement agent 110 adapted to gather information that uniquely identifies the client application 104. The gathered information can be used, as will be described further below, to identify the client application 104 as being authorized to perform certain functions or tasks. A client application 104 requesting certain secure services from a trusted application 114 may be loaded into a fixed or predetermined portion of physical memory 212a by the kernel 106. In some embodiments it is desirable to have the hypervisor 108 load the client application 104 into a predetermined portion of physical memory 212a. The measurement agent 110 then calculates a hash over the predetermined portion of physical memory 212a into which the client application 104 was loaded. The measurement agent 110 may also generate a digital signature for the client application 104 after it has been loaded. Alternatively, an author of the client application can generate a digital signature of the client application 104 binary. The authorization service may then rely on the same origin policy to authorize any client applications 104 distributed by a trusted author. A same origin policy is useful for example when frequent updates of an authorized client application are distributed by a trusted author.

In some embodiments the measurement agent 110 is adapted to gather additional meta-data associated with the client application 104. This additional meta-data may, for example, include information such as the author, application name, release date, etc. embedded by the originating entity in a digital certificate signed by a trusted certificate authority and distributed along with the client application 104. The additional meta-data may then be included in a measured value to help identify and ultimately authorize the client application 104.

Three primary privilege levels are provided in the REE 230. The hypervisor privilege level is the most privileged or least restrictive level allowing access to all hardware, firmware, and software in the REE 230. Because computer applications executing in hypervisor mode have access to all hardware, including physical random access memory and other memory 212 as well as any memory management units (MMU) accessible within the REE 230, a computer application executing at the hypervisor privilege level also has access to all software and firmware within the REE 230.

The next least restrictive privilege level is referred to as the kernel privilege level. The kernel privilege level is more restrictive than the hypervisor privilege level, thereby allowing a computer application that is executing at the hypervisor privilege level to limit or restrict what a computer application executing at the kernel privilege is allowed to do.

The most restrictive privilege level is the user privilege level. Computer applications executing in user space 102, such as a client application 104, execute at the user privilege level. The user privilege level is more restricted than both the hypervisor privilege level and the kernel privilege level. Thus, computer applications executing at the user privilege level may be limited or restricted by both kernel mode applications and hypervisor mode applications.

In certain embodiments it may be desirable to support finer grained protection controls by creating additional privilege levels within each of the above described hypervisor, kernel, and user privilege levels. However, the use of finer grained controls is not germane to the subject disclosure and as an aide to understanding the terms hypervisor privilege level, kernel privilege level, and user privilege level will be used to refer to all finer privilege levels used by each of the hypervisor 108, kernel 106, or user space 102, computer applications respectively.

Secure services, such as services requiring the use of cryptography, cryptographic keys, and/or other confidential data or material need to be protected with both software security as well as physical security. Security appropriate for storing and executing secure services is provided in the computing apparatus 100 by the SEE 112. The SEE 112 is configured to host and protect trusted applications 114 and other secure or services 124. In one embodiment the SEE 112 includes a computing environment similar to but isolated from the computing environment described above with respect to the REE 230 incorporating its own privilege levels and execution environments.

A trusted application 114 executes within the SEE 112 and is configured to provide secure services to client applications 104 executing in user space 102. An example of one possible type of client application 104 that would benefit from access to secure services exposed by the trusted application 114 may be a media player application that uses secure services to perform cryptographic operations on a digital rights management (DRM) license to gain access to data protected by DRM. It is easy to imagine that unauthorized or malicious applications may also try to gain access to the secure services provided by a trusted application 114. Therefore the trusted application needs to verify that the client application is authorized to use the secure services before performing any requested operations.

The SEE 112 includes an authorization service 118 configured to determine whether a client application 104 is authorized to access secure services provided by the trusted application 114. The authorization service 118 executes within the SEE 112 to ensure a malicious application cannot tamper with the authorization process and gain access to services for which it is not authorized. The authorization determination may be implemented in an authorization service 118 separate from the trusted application 114 as illustrated in FIG. 1. Alternatively an authorization service and authorization determination may be incorporated directly within the trusted application 114.

It is important for the authorization service 118 to verify the identity of the client application 104 prior to making any authorization determination. To support reliable identification of the client application 104, the authorization service 118 requests information about the client application 104 from the measurement agent 110. Measurement values received from the measurement agent 110 are used by the authorization service 118 to support making an authorization determination. This determination may be based on an access control list maintained within the SEE 112. When the measured values associated with the client application 104 are not found in the local access control list, the authorization service 118 may contact an external authorization service 120. Communicating with external entities can be time consuming. It is therefore desirable to minimize the amount of external communication. The frequency with which the authorization service 118 needs to contact an external authorization service 120 can be reduced by having the authorization service 118 update its local access control list based on the information received from the authorization service 120.

In one embodiment the communication channel 134 between the authorization service 118 and the external authorization service 120 is cryptographically secured. The authorization service 118 and the external authorization service 120 may both be provisioned with the same shared key 116, 138. The shared key 116, 138 can then be used to encrypt/decrypt data sent over the communication channel 134.

Reliable identification of a client application 104 is necessary in order to make authorization determinations. However, new versions of the client application 104 may be provisioned to the computing apparatus 100 or totally new client applications 104 may be deployed. These new or updated applications may require use of secure services provided by the trusted application 114 and will therefore require authorization determinations. It is desirable to incorporate into the computing apparatus 100, a safe and secure mechanism to dynamically update information used to authorize client applications 104.

During execution of a client application 104 that needs to use secure services provided by a trusted application 114, the client application 104 sends a request for secure services 124 to the trusted application that is executing within the SEE 112. Before responding to the request for secure services 124, the trusted application 114 verifies the client application 104 that is requesting the secure services 124 is authorized to use the requested services.

The trusted application 114 sends a measurement request 128 to the hypervisor 108 or to a measurement agent 110 incorporated into the hypervisor 108. Because authorization decisions are based on measured values, the communication channel 132 between the SEE 112 and the hypervisor 108 used to send the measured values may be secured to prevent a malicious application from tampering with the measured values. In certain embodiments the communication channel 132 may be secured by sharing a secure portion 136 of the physical random access memory 226 between the hypervisor 108 and the SEE 112.

A client application 104 that was able to intercept measurement requests/responses 128 would also be able to modify the intercepted messages and return fake measurement data to the authorization service 118 thereby gaining unauthorized access to secure services. Securing the communication channel 132 prevents access to the measurement requests/responses and protects the confidentiality and integrity of the measurement requests/responses 128.

One exemplary manner for securing the communication channel 132 is through the use of a secure portion of physical random access memory 136. This secure portion of physical random access memory 136 is accessible only to the hypervisor 108 and to the SEE 112 allowing the hypervisor 108 and SEE 112 to trust messages information read from the shared portion of physical random access memory 136.

The hypervisor 108 or a measurement agent 110 incorporated within the hypervisor 108 generates a measured value corresponding to the client application. The measured value may include a hash of the client application or a hash of a predetermined portion 212a of the physical memory 226 into which the client application 104 was loaded. In certain embodiments the measurement agent 110 is configured to incorporate additional meta-data into the measured value. The meta-data may include information about the client application 104, the entity that produced the application, author, etc. and may be obtained from data embedded in a digital certificate associated with the client application 104.

The measured value is returned to the authorization service 118 where the measured value is used to determine if the client application 104 is authorized to access the requested secure services. In one embodiment the measured value is checked against an access control list maintained within the SEE 112. If the measured value corresponds to information in the access control list an authorization determination may be made.

When an authorization determination cannot be made based on the access control list, the authorization service 118 may contact an external authorization service 120 to obtain an authorization determination. In one embodiment the authorization service 118 updates the locally maintained access control list based on information returned from the external authorization service 120.

Once it is determined that the client application 104 is authorized to access the requested secure services, the trusted application may perform the requested secure operations and return the result to the client application 104.

FIG. 2 illustrates a block diagram of an exemplary computing apparatus 200 configured to provide a SEE 112 appropriate for use as the SEE 112 described above and with reference to FIG. 1. The computing apparatus 200 may be incorporated into various types of computing apparatus such as mobile phones, phablets, tablet computers, laptop computers, set top cable boxes, televisions, automobiles, etc., and can be advantageously employed to protect secure services 124 offered by trusted applications 114 residing within the SEE 112. The computing apparatus 200 is adapted to provide both a SEE 112 and a REE 230.

The REE 230 is configured to provide a broad range of functionality and features to support a wide variety of applications and provide an enhanced user experience. However, the REE 230 is inherently less secure than the SEE 112 and cannot safely perform cryptographic operations without risking loss of confidentiality or integrity of the cryptographic keys and data.

In the example of FIG. 2, the computing apparatus 200 includes a processor 210 coupled to a memory 212 where a first portion 202 of the processor 210 and a first portion 204 of the memory 212 are configured to support a SEE 112. A second portion 206 of the processor 210 and a second portion 208 of the memory 212 are configured to support a REE 230.

The processor 210 may be a single processing device or may comprise a plurality of processing devices including special purpose devices, such as for example, digital signal processing (DSP) devices, microprocessors, specialized processing devices, parallel processing cores, or general purpose computer processors. The processor 210 is configured to read program instructions from a memory 212 and perform the methods and processes described herein. The processor may also include a CPU working in tandem with a graphics processing unit (GPU) which may include a DSP or other specialized graphics processing hardware.

The memory or physical memory 212 is a combination of various types of volatile and non-volatile computer memory such as for example magnetic or optical disk, or other types of read only memory (ROM) 222, along with random access memory (RAM) 224. The physical memory 212 may include any desired type of computer memory. The first or secure portion 204 of memory 212 may include a one-time programmable memory configured to protect confidential data. The memory 212 stores computer program instructions that may be accessed and executed by the processor 210 to cause the processor to perform a variety of desirable computer implemented processes or methods such as the methods for protecting secure services described herein.

The SEE 112 is configured to ensure the confidentiality and integrity of data and computer programs stored within SEE memory portion 204, and to protect computer programs executing within the secure portion 202 of the processor 210. The SEE 112 may be implemented for example using various technologies such as a trusted execution environment (TEE) or other suitable technology adapted to provide both a REE 230 and a SEE 112 within a computing apparatus 200.

In certain embodiments it may be desirable to configure the secure portion 202 of the processor 210 to access an external authorization service 120. Communication between the secure portion 202 of the processor 210 and the external authorization service 120 may be secured when desired using a shared secret key having a first copy of the shared secret key 116 protected within the SEE 112 and a second copy of the shared secret key 138 residing with the external authorization service 120.

To maintain a security boundary between the SEE 112 and REE 230, the second portion 206 of the processor 210 is allowed access 218 only to the REE portion of the memory 208. The extra security provided by the SEE 112 allows the SEE portion 202 of the processor 210 to access both the first portion 204 of the memory 212 as well as the second portion 208 of memory 212 without significantly increasing risk.

Figure 3:
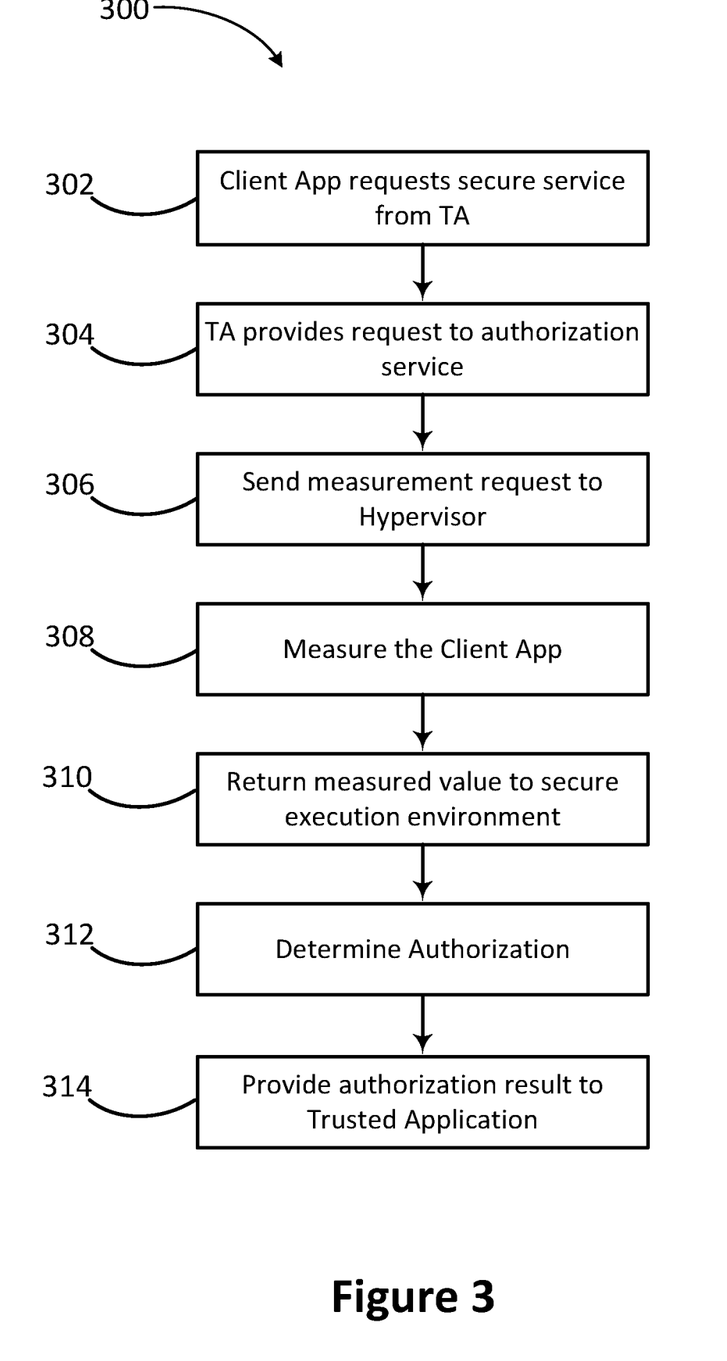
FIG. 3 illustrates a flow chart of an exemplary method for authorizing access to secure services incorporating aspects of the disclosed embodiments.

FIG. 3 illustrates an exemplary method 300 for authorizing access to secure services provided by a trusted application executing within a secure execution environment. In the method 300 a client application requiring secure services, requests 302 secure services from a trusted application. The client application may be any appropriate user facing computer application, such as for example a media player application executing on a mobile communications device or other appropriate computing apparatus configured to execute user facing computer applications.

The term "secure services" generally refers to computing services that require the use of confidential data or key material or protected cryptographic algorithms. The confidential material required to perform the secure services needs to be well protected from tampering or theft and therefore may be incorporated within a SEE, such as the SEE 112 described above and with respect to FIGS. 1 and 2. The client application is adapted to execute with a lower level of protection and needs to provide a rich computing experience. Therefore the client application is run in a REE, or a normal world computing environment.

Before servicing the request for secure services, the trusted application provides 304 a request for authorization to an authorization service. The authorization service may be implemented as an integral part of the trusted application. Alternatively, the authorization service may be implemented as a separate authorization service executing within the same SEE as the trusted application such that the same authorization service may be used by multiple trusted applications that may be executing in the same SEE. The request for authorization includes information from the client application and may also include information about the secure services being requested and/or the trusted application making the request.

The authorization service sends 306 a measurement request from the SEE to a measurement agent incorporated within a hypervisor executing in the REE. Since the hypervisor executes at a higher privilege level it is able to access the client application to perform a measurement while preventing the client application from tampering with the measurement or the resulting measured value.

The measurement agent incorporated into the hypervisor measures 308 the client application. Measuring the client application entails generating a measured value that uniquely identifies the client application. It is also desirable to have the measured value ensure integrity of the client application. For example, the measurement agent may compute a hash value over the memory occupied by the client application. In certain embodiments, the hypervisor, or other privileged computer application such as a kernel, may load the client application into a predetermined portion of the random access memory then calculate the hash value over this predetermined portion of the random access memory. It may also be desirable for the hypervisor to generate a digital signature for the loaded client application.

In addition to a hash or other computed value, the measurement agent may collect additional information about the client application. For example, many computer applications are distributed with a digital certificate that identifies the distributor or author of the client application along with a hash or other value. The certificate uses cryptography to validate the information incorporated in the certificate, and the hash or other value may be used to verify integrity of the client application. Including this or other information into the measured value can aide the authorization service when making an authorization determination.

For example, when an application is updated, it may not exactly match information known to the authorization service. It may be useful for an authorization service to be configured to authorize any client application distributed by a particular author or company as identified by the digital certificate.

The measured value generated by the measurement agent is returned 310 to the authorization service in the SEE. The authorization service can then use the measured value to make an authorization determination 312 to either grant or deny access 314 to the requested secure services requested by the client application. The trusted application now has a reliable and secure basis for granting or denying access 314 to the requested secure services to the client application.

A conventional solution for measurement and verification of computer applications is the Trusted Platform Module (TPM) that provides what is often referred to as an authenticated boot solution. The TPM measures the booted configuration and compares the measurement to reference values. Some of the services provided by the TPM can be made available only when an authorized configuration is booted. The TPM approach is not as flexible as the approaches disclosed herein and the update mechanisms included in the TPM approach can expose security risks.

The Linux OS provides a solution referred to as Linux Integrity Measurement Architecture (IMA) where the Linux Kernel calculates a hash value of user space code. For example a hash value of executable code may be calculated when the executable computer application code is loaded into memory, or user space. The calculated hash value may then be compared to reference hash values stored in the Linux Kernel. Alternatively, the hash value may be forwarded to a SEE were the SEE can then make access control decisions based on the hash value and an access control list (ACL). The size of the Linux Kernel and the need to regularly update the Linus kernel with patches from various sources poses a significant security risk when using IMA for making measurements or access decisions.

Thus, while there have been shown, described and pointed out, fundamental novel features of the invention as applied to the exemplary embodiments thereof, it will be understood that various omissions, substitutions and changes in the form and details of apparatus and methods illustrated, and in their operation, may be made by those skilled in the art without departing from the spirit and scope of the presently disclosed invention. Further, it is expressly intended that all combinations of those elements, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice.

What is claimed is:

1. An apparatus comprising a processor and a memory, the processor and the memory configured to provide a secure execution environment and a rich execution environment, wherein the processor is configured to provide:
   a client application configured to execute within the rich execution environment at a user privilege level;
   a hypervisor configured to execute within the rich execution environment at a hypervisor privilege level, wherein the user privilege level is more restrictive than the hypervisor privilege level; and a trusted application configured to execute within the secure execution environment and to provide secure services to the client application,
   wherein the processor is configured to:
   send a request for secure services from the client application to the trusted application;
   send a measurement request from the trusted application to the hypervisor;
   generate, within the hypervisor, a measured value based on the client application;
   return the measured value from the hypervisor to the trusted application; and
   determine, within the trusted application, whether the client application is authorized to access the requested secure services, wherein the determination is based on the measured value.

2. The apparatus according to claim 1, wherein the processor is further configured to:
   provide an authorization service configured to execute within the secure execution environment;
   send an authorization request from the trusted application to the authorization service, wherein the authorization request comprises information corresponding to the client application and the request for secure services; and send the measurement request from the authorization service to the hypervisor.

3. The apparatus according to claim 2, wherein the authorization service comprises an access control list, and the processor is configured to determine whether the client application is authorized to access the requested secure services based on the measured value and the access control list.

4. The apparatus according to claim 3, wherein, if the measured value is not found in the access control list, the processor is configured to:
send a request for authorization from the authorization service to a network based authorization server, wherein the request for authorization comprises the measured value;
receive an authorization result from the network based authorization server; and
determine whether the client application is authorized to access the requested secure services based on the authorization result.

5. The apparatus according to claim 4, wherein the processor is configured to update the access control list based on the received authorization result.

6. The apparatus according to claim 1, wherein the processor is configured to:
establish a secure communication channel between the secure execution environment and the hypervisor; and
send the measurement request from the secure execution environment to the measurement agent via the secure communication channel.

7. The apparatus according to claim 6, wherein the memory comprises a physical random access memory and the secure communication channel comprises a secure portion of the physical random access memory, wherein the secure portion of the physical random access memory is accessible only to the secure execution environment and the hypervisor.

8. The apparatus according to claim 1, wherein the memory further comprises a non-volatile memory and the measured value comprises a hash value, the processor is configured to load the client application from the non-volatile memory into a predetermined portion of the physical random access memory and generate the hash value based on the predetermined portion of the physical random access memory.

9. The apparatus according to claim 8, wherein the processor is configured to generate the hash value by calculating a hash over the data stored in the predetermined portion of the physical random access memory.

10. The apparatus according to claim 8, wherein the processor is configured to:
provide an operating system kernel configured to execute within the rich execution environment at a kernel privilege level, wherein the kernel privilege level is more restrictive than the hypervisor privilege level and the kernel privilege level is less restrictive than the user privilege level; and
load the client application while operating at one of the kernel privilege level and the hypervisor privilege level.

11. The apparatus according to claim 8, wherein the processor is configured to generate a digital signature of the predetermined portion of the physical random access memory after the client application has been loaded, and wherein the measured value comprises the digital signature.

12. The apparatus according to claim 1, wherein the measured value comprises meta data about the client application, and wherein the processor is configured to generate the measured value based on at least one of the hash value, the digital signature, a digital certificate corresponding to the author of the client application, and a digital certificate corresponding to the client application.

13. A mobile communication device comprising: a processor and a memory, the processor and the memory configured to provide a secure execution environment and a rich execution environment,
wherein the processor is configured to provide:
a client application configured to execute within the rich execution environment at a user privilege level;
a hypervisor configured to execute within the rich execution environment at a hypervisor privilege level, wherein the user privilege level is more restrictive than the hypervisor privilege level; and a trusted application configured to execute within the secure execution environment and to provide secure services to the client application,
wherein the processor is configured to:
send a request for secure services from the client application to the trusted application;
send a measurement request from the trusted application to the hypervisor;
generate, within the hypervisor, a measured value based on the client application;
return the measured value from the hypervisor to the trusted application; and
determine, within the trusted application, whether the client application is authorized to access the requested secure services, wherein the determination is based on the measured value.

14. A method comprising:
sending a request for secure services from a client application to a trusted application, wherein the client application is executing at a user privilege level within a rich execution environment and the trusted application is executing within a secure execution environment;
sending a measurement request from the secure execution environment to a hypervisor, wherein the hypervisor is executing at a hypervisor privilege level within the rich execution environment;
generating a measured value within the hypervisor, wherein the measured value comprises meta-data corresponding to the client application;
returning the measured value from the hypervisor to the trusted application;
determining within the secure execution environment an authorization result wherein the authorization result is based on the measured value and the authorization result comprises an indication whether the client application is authorized to access the requested secure services; and
providing the determined authorization result to the trusted application.

15. The method according to claim 14, wherein the method further comprises:
providing an authorization service configured to execute within the secure execution environment;
sending an authorization request from the trusted application to an authorization service, wherein the authorization request comprises information corresponding to the client application and the request for secure services; and
sending the measurement request from the authorization service to the hypervisor.

16. The method according to claim 15, wherein the authorization service comprises an access control list, and the method comprises:
- determining whether the client application is authorized to access the requested secure services based on the measured value and the access control list.

17. The method according to claim 16, wherein, if the measured value is not found in the access control list, the method comprises:
- sending a request for authorization from the authorization service to a network based authorization server, wherein the request for authorization comprises the measured value;
- receiving an authorization result from the network based authorization server; and
- determining whether the client application is authorized to access the requested secure services based on the authorization result.

18. The method according to claim 17, wherein the method further comprises:
- updating the access control list based on the received authorization result.

19. The method according to claim 14, wherein the method further comprises:
- establishing a secure communication channel between the secure execution environment and the hypervisor; and
- sending the measurement request from the secure execution environment to the measurement agent via the secure communication channel.

20. The method according to claim 14, wherein the measured value comprises meta data about the client application, and wherein the method comprises:
- generating the measured value based on at least one of a hash value, a digital signature, a digital certificate corresponding to an author of the client application, and a digital certificate corresponding to the client application.

* * * * *